United States Patent
Tomasch (10) Patent No.: US 7,128,305 B2
(45) Date of Patent: *Oct. 31, 2006

(54) UNITARY SLOT VALVE ACTUATOR WITH DUAL VALVES

(75) Inventor: Gregory A. Tomasch, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/110,141

(22) Filed: Apr. 19, 2005

(65) Prior Publication Data

US 2005/0178993 A1 Aug. 18, 2005

Related U.S. Application Data

(62) Division of application No. 09/541,069, filed on Mar. 30, 2000, now Pat. No. 6,913,243.

(51) Int. Cl.
*B65G 49/07* (2006.01)
*F16K 3/10* (2006.01)

(52) U.S. Cl. ........................ 251/211; 251/167

(58) Field of Classification Search .............. 251/167, 251/195, 298, 211; 414/217; 137/613, 614.11, 137/614.13
See application file for complete search history.

(56) References Cited

U.S. PATENT DOCUMENTS

| | | | |
|---|---|---|---|
| 3,789,875 A | 2/1974 | Boyd et al. ................ 137/554 |
| 4,157,169 A | 6/1979 | Norman .................... 251/195 |
| 4,328,947 A | 5/1982 | Reimpell et al. ........... 251/167 |
| 4,340,462 A | 7/1982 | Koch ........................ 204/298 |
| 4,355,937 A | 10/1982 | Mack et al. ............... 414/217 |
| 4,453,699 A * | 6/1984 | Hulsey et al. ............. 251/298 |
| 4,483,654 A | 11/1984 | Koch et al. ................ 414/744 |
| 4,593,915 A | 6/1986 | Seger et al. ................. 277/12 |
| 4,715,764 A | 12/1987 | Hutchinson ................ 414/217 |
| 4,715,921 A | 12/1987 | Maher et al. .............. 156/345 |
| 4,721,282 A | 1/1988 | Shawver et al. ............ 251/193 |
| 4,747,577 A | 5/1988 | Dimock ..................... 251/193 |
| 4,753,417 A | 6/1988 | Madocks et al. .......... 251/193 |
| 4,795,299 A | 1/1989 | Boys et al. ................ 414/217 |
| 4,804,086 A | 2/1989 | Grohrock ................... 206/328 |
| 4,813,846 A | 3/1989 | Helms ..................... 414/744.1 |
| 4,917,556 A | 4/1990 | Stark et al. ................ 414/217 |
| 5,002,255 A | 3/1991 | Sawa et al. ............... 251/193 |

(Continued)

FOREIGN PATENT DOCUMENTS

EP          63312574          12/1988

(Continued)

*Primary Examiner*—Eric Keasel
(74) *Attorney, Agent, or Firm*—Martine Penilla & Gencarella, LLP (57) ABSTRACT

A unitary slot valve actuator is in a vacuum body between process and transport modules. A separate valve is provided on the unitary actuator for each of two valve slots, each slot being closed or opened according to the position of the unitary actuator. The separate valves allow a vacuum condition to be maintained in the transport module while an adjacent process module is open to the atmosphere for servicing. Access to both open valves for servicing is by centering the unitary actuator to hold both valves open, but not vertically-spaced, relative to the slots. The open valves are easily reached by a service worker through an access port. A computer workstation operates a controller for the slot closure, and for moving the unitary actuator and the valves from the open and centered position, away from the slots to expose seal surfaces around the slots for cleaning.

17 Claims, 8 Drawing Sheets

U.S. PATENT DOCUMENTS

| | | | |
|---|---|---|---|
| 5,076,205 A | 12/1991 | Vowles et al. | 118/719 |
| 5,100,276 A | 3/1992 | Iwasaki et al. | 414/222 |
| 5,120,019 A | 6/1992 | Davis, Jr. | 251/193 |
| 5,150,882 A | 9/1992 | Kaneko | 251/193 |
| 5,292,393 A | 3/1994 | Maydan et al. | 156/345 |
| 5,383,338 A | 1/1995 | Bowsky et al. | 137/559 |
| 5,562,800 A | 10/1996 | Kawamura et al. | 156/643.1 |
| 5,667,197 A | 9/1997 | Boyd et al. | 251/193 |
| 5,697,749 A | 12/1997 | Iwabuchi et al. | 414/217 |
| 5,769,952 A | 6/1998 | Komino | 118/733 |
| 5,789,318 A | 8/1998 | Delfino et al. | 483/656 |
| 5,820,104 A | 10/1998 | Koyano et al. | 251/326 |
| 5,902,088 A * | 5/1999 | Fairbairn et al. | 414/217 |
| 6,079,693 A | 6/2000 | Ettinger et al. | 251/195 |
| 6,095,741 A | 8/2000 | Kroeker et al. | 251/193 |
| 6,390,448 B1 * | 5/2002 | Kroeker et al. | 251/167 |

FOREIGN PATENT DOCUMENTS

| | | |
|---|---|---|
| EP | 377464 A2 | 11/1990 |
| EP | 05010460 | 1/1993 |
| EP | 591085 A1 | 6/1994 |
| EP | 07027235 | 1/1995 |
| GB | 851444 | 10/1960 |
| WO | WO 92/02950 | 2/1992 |
| WO | WO 99/03133 | 1/1999 |
| WO | WO99/61822 | 12/1999 |
| WO | WO 00/02228 | 1/2000 |

* cited by examiner

UNITARY SLOT VALVE ACTUATOR WITH DUAL VALVES

CROSS-REFERENCE TO RELATED APPLICATION

This application is a Divisional Application of U.S. patent application Ser. No. 09/541,069, now U.S. Pat. No. 6,913,243, filed on Mar. 30, 2000, and entitled "Unitary Slot Valve Actuator With Dual Valves" (THE "PARENT APPLICATION"). The benefit of the Parent Application is claimed under 35 USC 120. The disclosure of the Parent Application is incorporated herein by reference.

BACKGROUND

1. Field

Embodiments of the present invention relate generally to valves for modules of semiconductor processing equipment, and more particularly to a unitary slot valve actuator with dual slot valves and methods of implementing such valves between separate chambers of semiconductor processing equipment so that operations may continue in one chamber during servicing of the other chamber, which semiconductor equipment may be a multi-chamber vacuum system.

2. Description of the Related Art

In vacuum processing of thin film materials, such as in the manufacture of semiconductor devices, multiple process chambers are interfaced to permit transfer of wafers, for example, between the interfaced chambers. Such transfer is via transport modules that move the wafers, for example, through slots or ports that are provided in the adjacent walls of the interfaced chambers. For example, transport modules are generally used in conjunction with a variety of substrate processing modules, which may include semiconductor etching systems, material deposition systems, and flat panel display etching systems. Due to the growing demands for cleanliness and high processing precision, there has been a growing need to reduce the amount of human interaction during and between processing steps. This need has been partially met with the implementation of transport modules which operate as an intermediate handling apparatus (typically maintained at a reduced pressure, e.g., vacuum conditions). By way of example, a transport module may be physically located between one or more clean room storage facilities where substrates are stored, and multiple substrate processing modules where the substrates are actually processed, e.g., etched or have deposition performed thereon. In this manner, when a substrate is required for processing, a robot arm located within the transport module may be employed to retrieve a selected substrate from storage and place it into one of the multiple processing modules.

Figure 1:
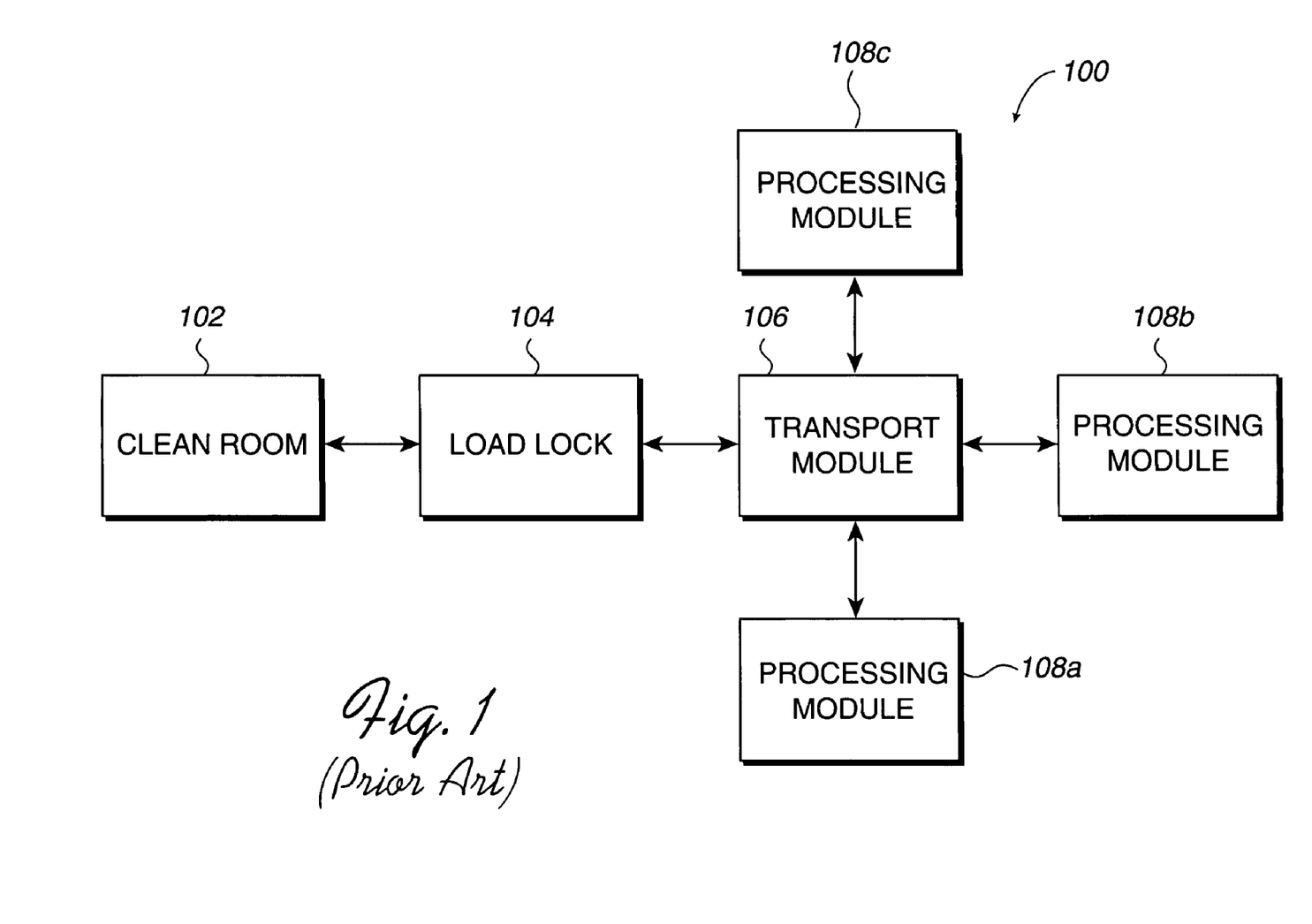
FIG. 1 depicts a typical prior art semiconductor process cluster tool architecture illustrating various process modules that interface with a transport module, wherein a single door valve is in one process or transport module such that the process and transport modules each must be shut down to enable servicing of either of the them.

As is well known to those skilled in the art, the arrangement of transport modules to "transport" substrates among multiple storage facilities and processing modules is frequently referred to as a "cluster tool architecture" system. FIG. 1 depicts a typical semiconductor process cluster tool architecture 100 illustrating the various chambers that interface with a transport module 106. Transport module 106 is shown coupled to three processing modules 108a–108c which may be individually optimized to perform various fabrication processes. By way of example, processing modules 108a–108c may be implemented to perform transformer coupled plasma (TCP) substrate etching, layer depositions, and/or sputtering.

Connected to transport module 106 is a load lock 104 that may be implemented to introduce substrates into transport module 106. Load lock 104 may be coupled to a clean room 102 where substrates are stored. In addition to being a retrieving and serving mechanism, load lock 104 also serves as a pressure-varying interface between transport module 106 and clean room 102. Therefore, transport module 106 may be kept at a constant pressure (e.g., vacuum), while clean room 102 is kept at atmospheric pressure. To prevent leaks between modules during pressure varying transitions, or to seal off a processing module from transport module 106 during processing, various types of gate drive valves are used to isolate the various modules.

For more information on gate drive valves, reference may be made to U.S. Pat. No. 4,721,282, which is hereby incorporated by reference. Another such gate drive valve is shown in U.S. Pat. No. 5,667,197, in which a prior art valve housing is shown having two port openings, and only one valve for one of the two port openings. Thus, it is not possible to close the port that does not have an associated valve. Also, the gate plate valve of the '282 Patent is shown for closing a port between abutting transport and process chambers, and no intermediate valve housing is provided. A drive assembly for the gate plate moves the gate plate in one continuous motion in a vertical path and in a rotating arc toward the internal port to effect a seal or closure of the internal port.

U.S. Pat. No. 5,150,882 shows one valve between various chambers of a treatment system, including between a decompression chamber and an etching chamber. Such one valve is driven for engagement and disengagement with a gate aperture by one air cylinder and a toggle arrangement such that stopper plates hit rollers with considerable impact. Initial vertical movement of a fitting plate is changed to horizontal movement by the link that is rotated counterclockwise, such that the gate moves toward the gate aperture. For the '882 Patent to avoid problems of the prior art, the stopper plates are made from a double boride hard alloy. Further, the single motion of the one air cylinder is not stopped, but instead continues its driving operation after the abutment of the stopper plates with the rollers. Thus, in addition to requiring special materials, the '882 Patent does not provide two valves between adjacent processing chambers.

Other valves for cluster tool architecture systems include a separate actuator for each of two valves, which tends to increase the width of a valve actuation housing or, when attempts are made to reduce such width, to restrict the location at which force is applied by the actuators to the valves. Also, such valves require a separate bellows for each of the two separate actuators. Because the cost of such bellows is substantial (e.g., in the range of $800.00 to $1000.00 each, in year 2000 U.S. dollar terms), it is costly to require two bellows. Further, each such separate actuator is generally driven by a separate pneumatic cylinder, which also increases costs when one separate actuator is required for each of the two valves.

In view of the forgoing, what is needed is a valve assembly between adjacent process or transport chambers, wherein operations in one such chamber may continue while servicing, for example, is performed in the other chamber, and wherein the valve assembly has only one common valve actuator for two valves, thus reducing the cost of the assembly by eliminating one bellows and two pneumatic drives.

SUMMARY

Broadly speaking, embodiments of the present invention fill these needs by providing a dual sided slot valve in a housing between adjacent chambers or modules, such as a transport chamber and a process chamber. Separate valves are provided for each of two valve housing ports or slots, such that one housing port adjacent to the process chamber or one housing port adjacent to the transport chamber, for example, may be selectively closed while the other port remains open. For example, the selectively closed valve facilitates maintaining a vacuum, for example, in a transport chamber while an adjacent process chamber is opened to the atmosphere to allow servicing to be performed. As a result, substantial periods of downtime are avoided in that no pump-down cycle is needed to bring the transport chamber to a desired vacuum after servicing the process chamber, and no other operations need be performed on the transport chamber due to the servicing of the process chamber.

Also, with the valve to the transport chamber closed so that the transport chamber is at vacuum, the passage of debris (such as broken wafers) from the open process chamber may be blocked by the open valve to the process chamber so that such debris does not contaminate the transport chamber. Thus, in general, only the valve door next to the process chamber need be replaced during servicing after it becomes corroded, and the transport chamber may remain at vacuum during such replacement.

Further, the dual sided slot valve is provided with these advantages while initially allowing easy access to one or both open valve(s) for performing service on the open valves. Such easy access is provided by a common actuator operated by first and second drives. To close one valve, the second drive is actuated and stops with the one valve closed and the other valve in an open, but not laterally-spaced (i.e., not vertically-spaced), position relative to the respective port. If both valves are to be serviced, the second drive is not actuated and the open position of each valve is maintained by a centering mechanism that holds the actuator centered in an open actuator position. In this open position the open valve or valves may be reached by a gloved hand of a worker for service. The first drive may function to move the actuator and cause both of the valves to move laterally (e.g., downwardly) away from the open position and away from the respective ports. The laterally-moved open valves expose the sealing surface around the ports, which permits cleaning of the sealing surfaces, for example. Due to the vertical distance between the laterally-moved valves and an access opening (which is normally closed by a lid), it is generally difficult for the protective glove of the worker to reach the valve for service after the vertical movement. In the laterally (vertically)-moved position, however, the valves do not interfere with the ability to clean around the valve doors, including the surfaces against which the doors seal.

Additionally, only one common actuator is provided for both of the slot valve doors so as to reduce the clean room real estate occupied by the valve housing between the adjacent transport and process chambers, for example. Also, such common actuator applies force to each of the slot valve doors at a central location of the slot valve door, which reduces the force required to maintain the slot valve door closed. Further, with only one actuator, only one bellows is required, as compared to the valve assemblies that have two actuators and that thus require two bellows.

It may be understood, then, that while normal operations continue in one chamber of two adjacent chambers, many types of servicing may be performed in the other of the two chambers. Such servicing may, for example, include removing broken pieces of wafers from a chamber or the valve housing, cleaning the sealing surface of a port, cleaning the interior of a chamber, and removing and replacing a member of a valve (e.g., a door or an O-ring) that effects the seal with the sealing surface. These and other operations for maintaining such chambers in normal operation for semiconductor processing, for example, are referred to herein as "servicing," or "service."

Other aspects and advantages of embodiments of the invention will become apparent from the following detailed description, taken in conjunction with the accompanying drawings, illustrating by way of example the principles of the embodiments of the invention.

BRIEF DESCRIPTION OF THE DRAWINGS

Embodiments of the present invention will be readily understood by reference to the following detailed description in conjunction with the accompanying drawings, in which like reference numerals designate like structural elements.

DETAILED DESCRIPTION OF THE PREFERRED EMBODIMENTS

Embodiments of an invention are described for methods and apparatus that ensure that operations may continue in one module of a semiconductor process cluster tool architecture during servicing of another module. Embodiment of the invention are described in terms of valves for modules of semiconductor processing equipment, and more particularly of a unitary slot valve actuator with dual valves and methods of implementing such valves between separate modules of semiconductor processing equipment. It will be obvious, however, to one skilled in the art, that embodiments of the present invention may be practiced without some or all of these specific details. In other instances, well known process operations have not been described in detail in order not to obscure the embodiments of the present invention.

Figure 2:
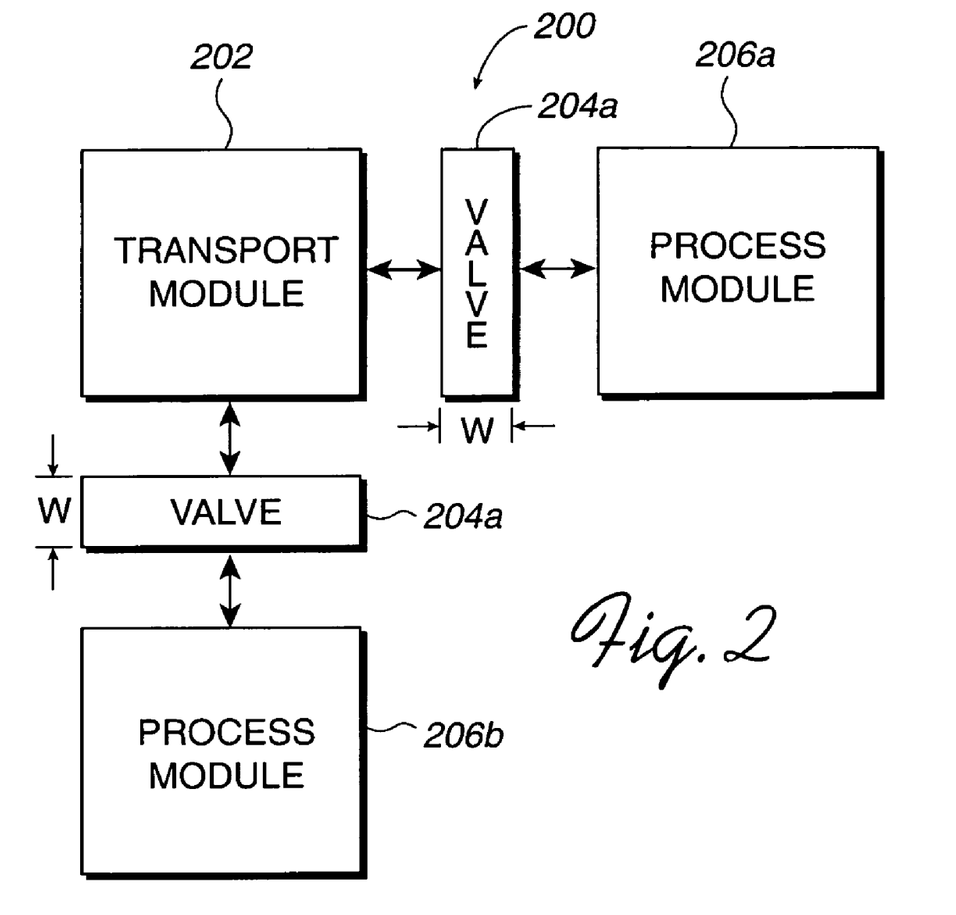
FIG. 2 depicts a dual sided slot valve embodiment of the present invention located between adjacent ones of a transport module and a process module, wherein two door valves are in a valve vacuum body of a valve housing between the transport and process modules, such that only a selected one of the modules need be shut down to enable servicing of the selected one of them.

Referring to FIG. 2, embodiments of the invention are generally described as including a semiconductor process cluster tool architecture 200 having a transport module 202 and process modules 206 (shown as 206a and 206b), wherein a dual sided slot valve 204 (shown as 204a) is located between adjacent ones of the transport module 202 and the process module 206. Considering FIG. 2 as a plan view, a footprint of the architecture is defined by the combined floor area of the transport module 202, the process modules 206, and the dual sided slot valves 204. It may be understood that the floor areas of the transport module 202 and the process modules 206 may be primarily dictated by considerations other than the manner in which the modules 202 and 206 are sealed together for operations. The individual dual sided slot valves 204 define the manner in which the modules 202 and 206 are sealed together for operations, such that the footprint of each individual dual sided slot valve 204 becomes significant in attempts to reduce the footprint of the cluster tool architecture 200. Thus, to reduce the footprint of each individual dual sided slot valve 204 it is important to reduce the width W of each of the individual dual sided slot valves 204 as much as possible.

Figure 3:
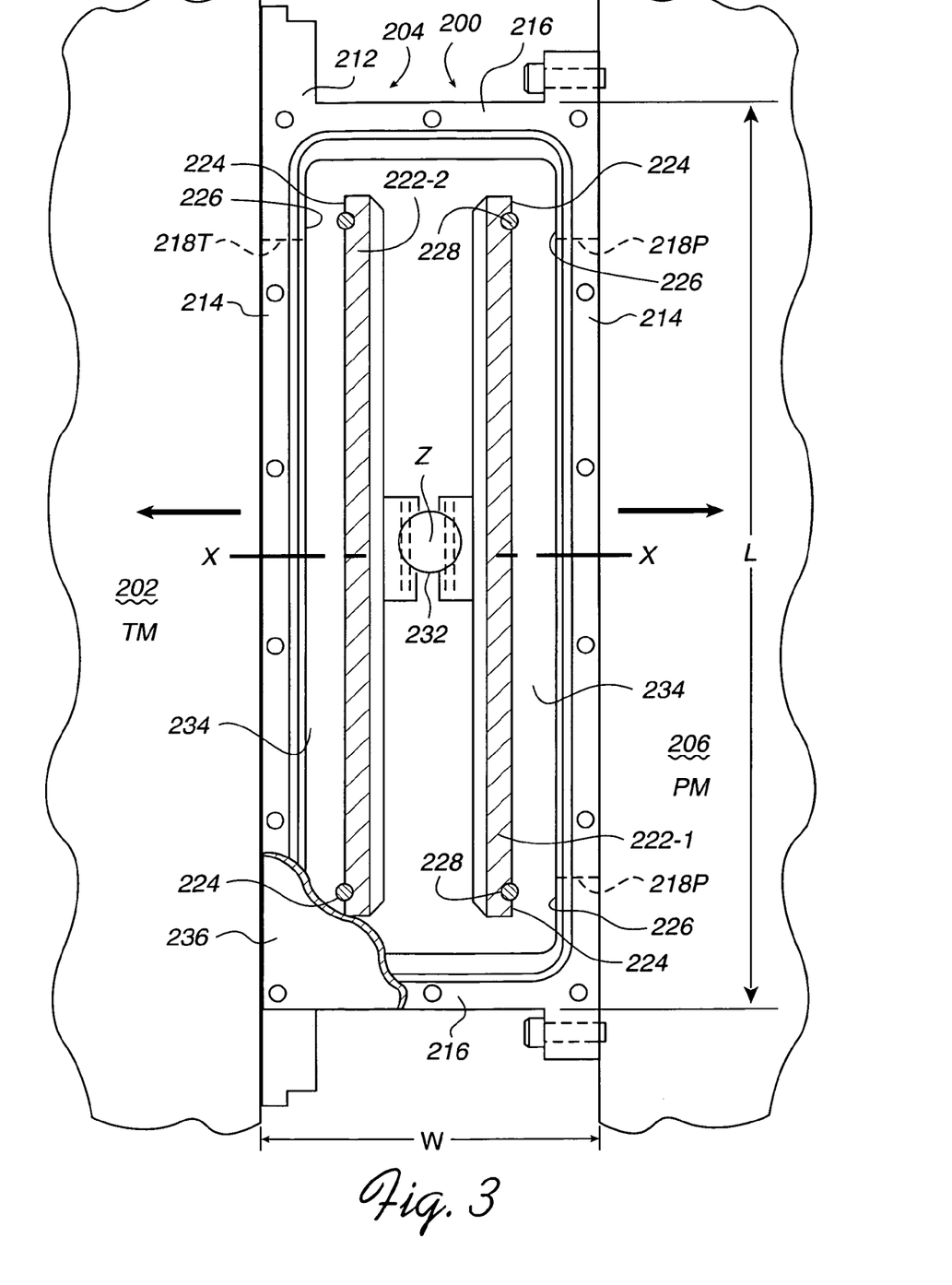
FIG. 3 is a plan view of a dual sided slot valve of an embodiment of the present invention showing the valve vacuum body having a width defined by opposite walls, and a slot in each wall to permit wafers to be transferred from a transport module to a process module, wherein one slot may be selectively closed by one of the two doors upon operation of a common actuator to permit continued operations within the one module while the other module is being serviced.

FIG. 3 shows one of the dual sided slot valves 204 of an embodiment of the invention as including a valve vacuum body 212 located between two modules of the cluster tool architecture 200. As shown, the two modules are the transport module 202 and one of the process modules 206, it being understood that valve vacuum body 212 (or housing) may be located between any two modules of the cluster tool architecture 200. The valve vacuum body 212 has the width W defined by opposite walls 214. The side of each wall 214 nearest to the process module 206 may be referred to as the "PM side," whereas the side of each wall 214 nearest to the transport module 202 may be referred to as the "TM side." The valve vacuum body 212 has a length L defined by opposite end walls 216, where the width W times the length L defines the footprint of the individual dual sided slot valve 204.

A port (or slot or opening) 218 is provided in each wall 214 to permit wafers (not shown), for example, to be transferred between one module and another module. As shown in FIG. 3, one such module is the transport module 202 and the other such module is the process module 206, with the slot 218P being adjacent to the process module 206 and the slot 218T being adjacent to the transport module 206. Each of the slots 218 is generally rectangular in shape and is smaller in each dimension than the generally rectangular shape of a door (or side door) 222 provided for closing the respective slot 218. FIG. 3 shows two of the doors 222, with an exemplary door, such as a first door, identified by the reference number 222-1 another exemplary door, such as a second door, identified by the reference number 222-2. In the case of the doors 222 and the slots 218, the corners are rounded, thus the respective rectangular shapes are referred to as "generally rectangular." Each of the doors 222 has a seal periphery 224 that overlaps an opposing seal surface 226 of the opposing wall 214 of the body 212. The seal periphery 224 may be provided with a seal device such as an O-ring 228 which is pressed against the seal surface 226 to provide a vacuum-tight, or gas-tight, seal when the door 222 is in a CLOSED position as described below. Alternatively, a seal device may be vulcanized to the door 222, or another type of seal device having a replaceable seal may be used. The door 222-2 at the wall 214 forms a pressure seal between the transport module 202 and the process module 206. In this manner, the PM side, for example, may be vented to atmosphere while the TM side remains at normal vacuum level (e.g., 80–100 mTorr). The valve 204 is also designed to allow the transport module 202 to be vented while the process module 206 is at vacuum, or to allow the process module 206 to be vented while the transport module 206 is at the vacuum level.

Referring to one of the doors 222, described as the first door 222-1 and shown for example at the right as viewed in FIG. 3, the respective slot 218P may be selectively closed upon operation of one, or a common, actuator 232. In FIG. 3, the common actuator 232 is shown as one actuator, also referred to as one door actuator or a common door actuator or one common door actuator. The common actuator 232 is shown in FIG. 3 as a single member, which is shown connected to each of the respective first and second doors 222-1 and 222-2, such that the common actuator 232 is common to both of the doors 222-1 and 222-2. FIG. 3 also shows a Z axis of the common actuator 232, which Z axis extends into the paper. The Z axis is shown extending up and down as viewed in FIGS. 5 and 6A, such that in these exemplary views of FIGS. 5 and 6A the Z axis extends vertically, and may be referred to as a longitudinal axis of the one common actuator 232. Use of the common actuator 232 permits, for example, continued operations within the transport module 202 while the process module 206, for example, is being serviced. Therefore, only a selected one of the transport module 202 and the process module 206 need be shut down to enable servicing of the selected one of them. One result of actuation of the common actuator 232 is to locate either door 222 in a CLOSED position, or in an OPEN position as shown in FIG. 3. In the OPEN position, either door 222 defines a space 234 between the door 222 and the wall 214. Another type of actuation of the actuator 232 is to locate the doors 222 in either a DOWN or an UP position, which positions are along the Z-axis shown in FIG. 3.

Figures 4A, 4B:
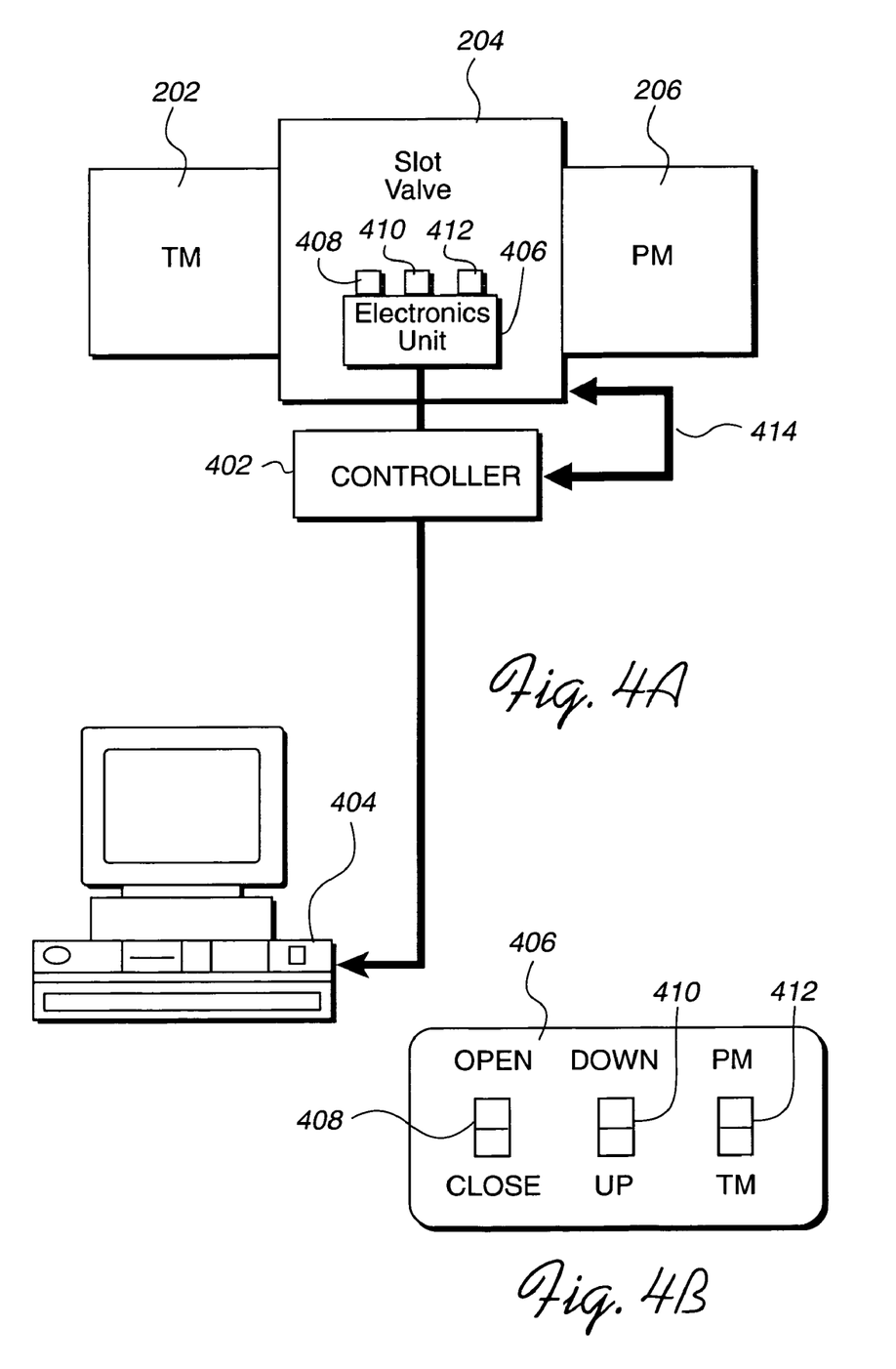
FIG. 4A is a schematic diagram of a controller for controlling the movements of a respective first door and a respective second door of the valve, wherein the controller is coupled to a computer workstation that is used to operate the dual slot valve.
FIG. 4B depicts three switches for providing input to the controller to facilitate controlling the movements of the first door and the second door of the valve.

FIG. 4A shows the transport module 202, the process module 206, and one of the dual sided slot valves 204. A controller 402 is connected to, and controls, the operation of the valve 204, including operation of the common actuator 232 for controlling the doors 222-1 and 222-2. The controller 402 is connected to a computer workstation, or tool-embedded controller, 404. The computer workstation 404 includes computer program instructions that cause the controller 402 to operate the common actuator 232 as described below. The controller 402 interfaces with the valve 204 via an electronics unit 406. FIG. 4B shows the top of the electronics unit 406 provided with a series of switches 408, 410, and 412, which are respectively for controlling the movement of the doors 222 into the OPEN and CLOSED positions, for controlling the movement of the doors 222 into the DOWN and UP positions, and for selecting which of the modules 202 and 206 is to be serviced (e.g., process module 206 is "PM"; and transport module 202 is "TM"). Examples of signals 414 transmitted between the controller 402 and the slot valve 204 are "Open Door" and "Close Door".

Figure 5:
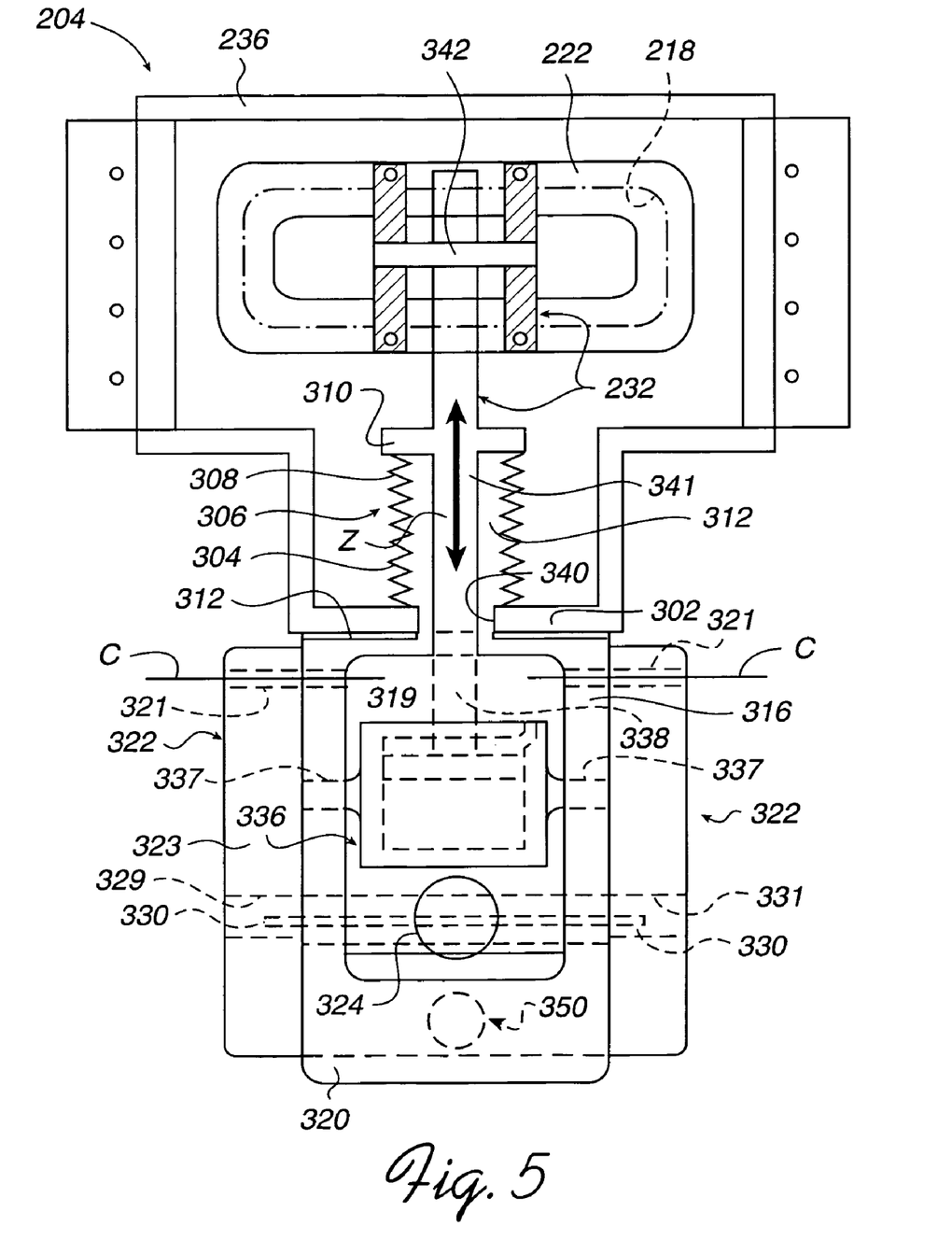
FIG. 5 is a vertical view of the dual sided slot valve of an embodiment of the present invention showing the common actuator moved by an open/close air cylinder which rotates a rocker to move one of the doors into an OPEN or a CLOSED position, wherein the common actuator is also moved by an up/down air cylinder which moves the doors relative to the slots when the doors are in the OPEN position and aligns the doors with a slot or moves the doors below the slots.
Figure 6A:
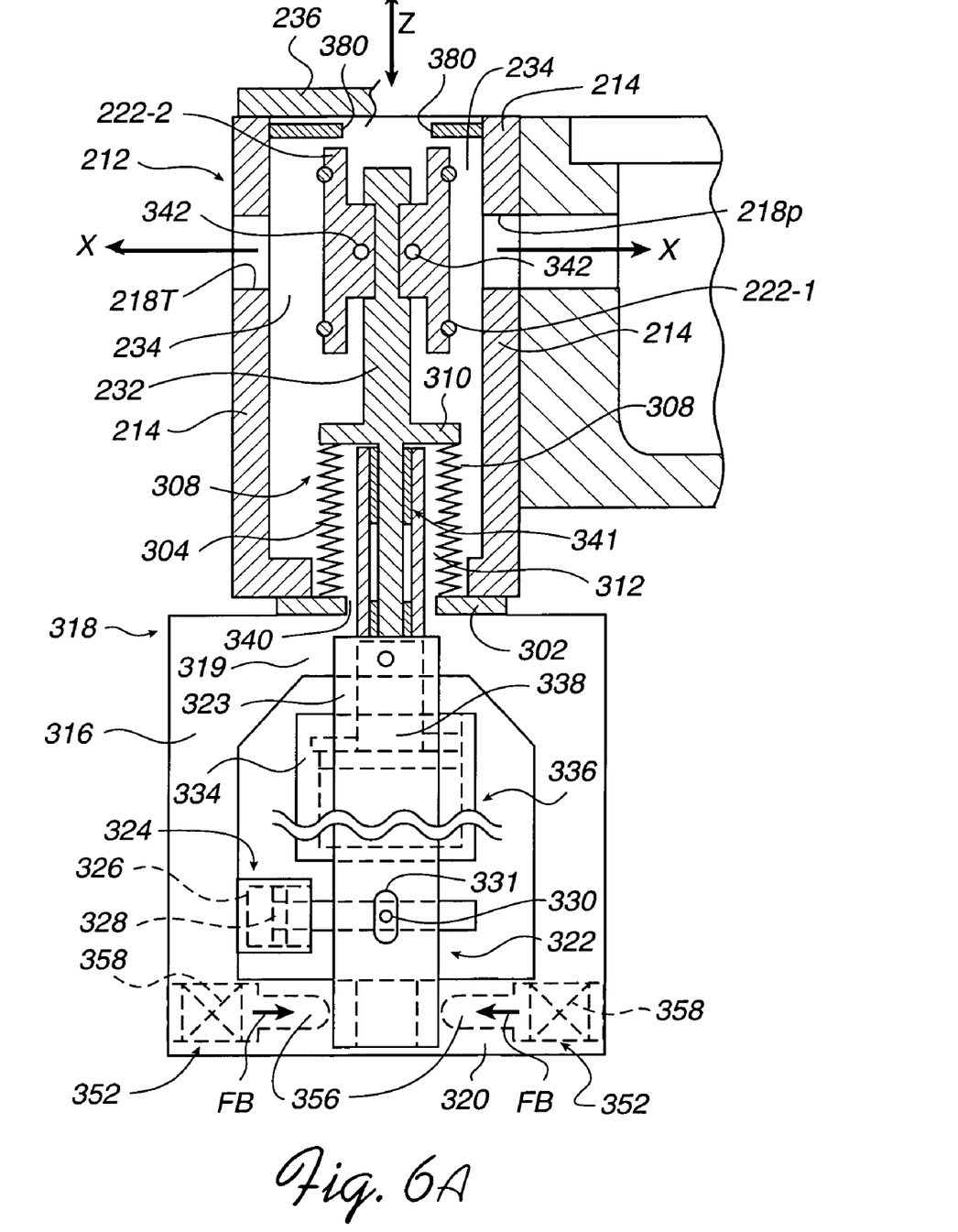
FIG. 6A is a vertical cross-sectional view showing the two dual sided slot valves of an embodiment of the present invention in an OPEN and UP position, and showing the common actuator carrying the two doors, wherein the common actuator has the two separately controllable motions to permit selected servicing operations to be performed on the process module, for example, while operations continue within the transport module.
Figure 6B:
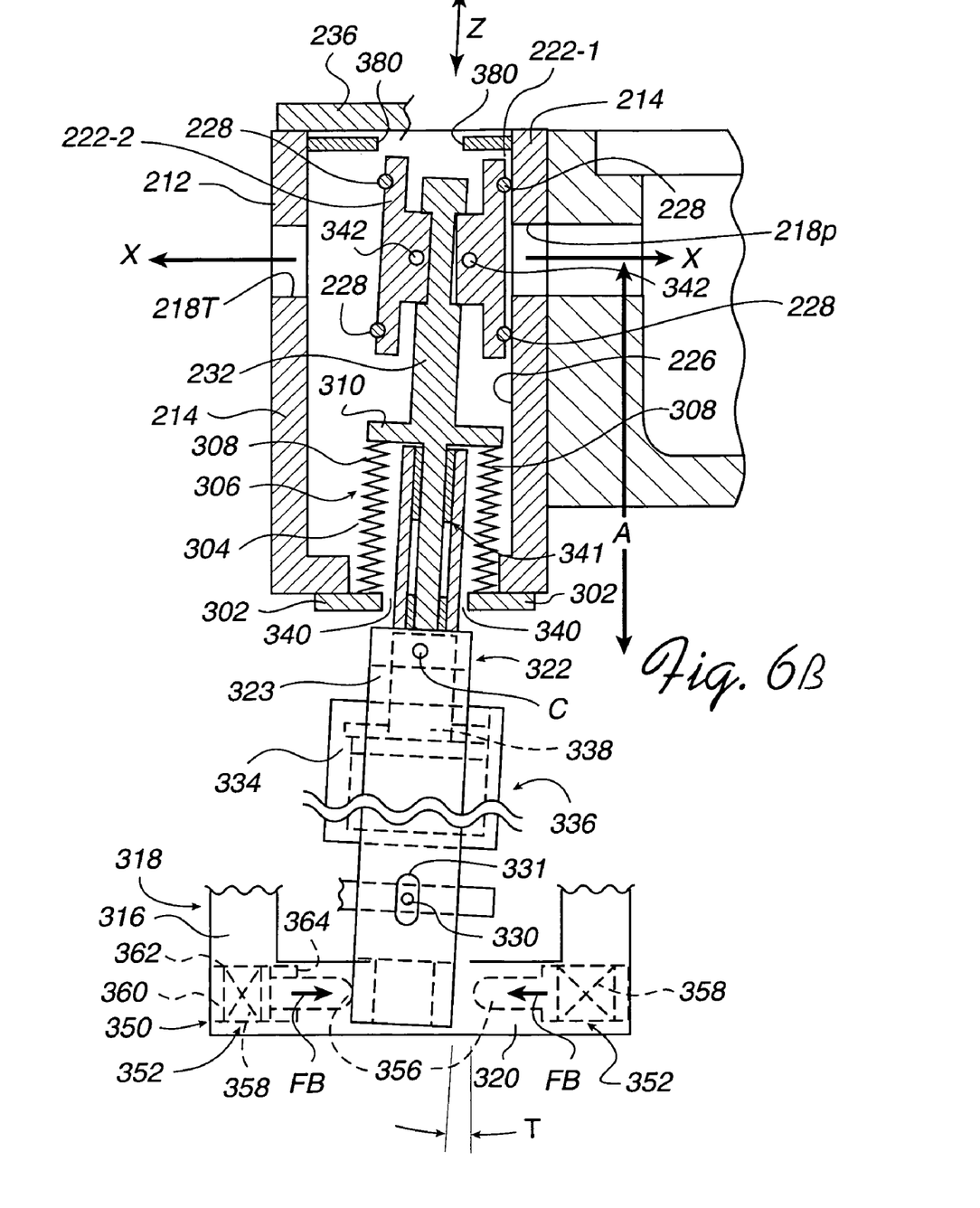
FIG. 6B is a vertical cross-sectional view similar to FIG. 6A showing one valve door of an embodiment of the present invention in a CLOSED and UP position to facilitate servicing of the other valve door.
Figure 6C:
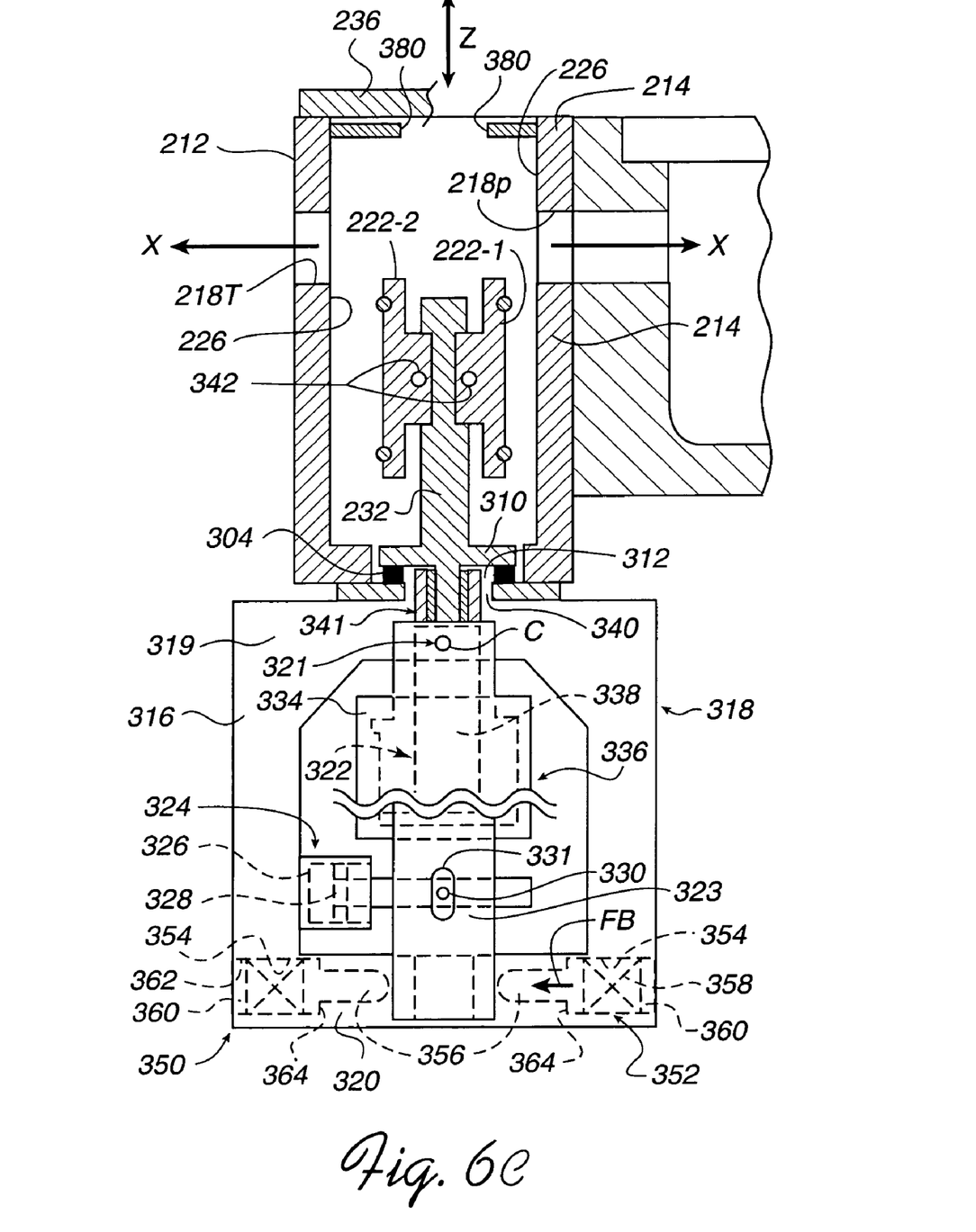
FIG. 6C is a vertical cross-sectional view similar to FIGS. 6A and 6B showing the two valves of an embodiment of the present invention in a DOWN and OPEN position to facilitate servicing of the valve slots.

The common actuator 232 is shown in FIGS. 5, 6A, 6B and 6C supporting the two doors 222-1 and 222-2. An X axis, or first axis, designates the arcuate path along which the doors 222 move from the CLOSED position of the door 222-1 (shown in FIG. 6B), the moving being to the left to the OPEN position of both doors 222 (shown in FIG. 6A). The X-axis may be generally perpendicular to the planes of the walls 214. FIGS. 6A–6C show that although the path of the doors 222-1 and 222-2 is arcuate relative to a cradle axis-C, the radius of the arc is large enough that the OPEN position of the doors 222 may be said to be perpendicular to and away from the side walls 214 of the body 212. In the OPEN position, the doors 222 define the spaces 234 between the respective door 222 and the respective wall 214. With the doors 222 in the OPEN position, the easy access to the valve 204 for service, as noted above, is provided. The advantage of initially allowing easy access to the valve 204 in the OPEN and UP position shown in FIG. 6A, which position is not vertically down (i.e., not laterally-spaced), is that in the OPEN and UP position the doors 222 of the valve 204 may be reached by a gloved hand (not shown) of a service worker for service when a lid 236 is removed from the body 212.

The Z-axis corresponds to the above-referenced exemplary vertical, or lateral, direction or spacing, and is also shown in FIGS. 5, and 6A, 6B, and 6C. As shown in FIGS. 6A and 6C, the Z-axis is the axis of the common actuator 232 along which the doors 222 move into the UP and DOWN positions relative to the ports 218 when the Z-axis is vertical. Comparing FIG. 6A to FIG. 6B, it may be appreciated that the Z-axis moves, and in particular, rotates on the cradle axis C (FIGS. 6B and 6C) from a vertical orientation (FIG. 6A) to a tipped orientation (FIG. 6B) at an angle T with respect to vertical. With the exemplary vertical orientation of the Z axis shown in FIG. 6A, and with the exemplary tipped orientation of the Z-axis as shown in FIG. 6B, FIG. 6B shows that there is a change in orientation of the Z-axis around the C-axis. This change in orientation, and the distance A from the C-axis to the center of the doors 222, result in FIGS. 6B and 6A showing the one common actuator 232 and the doors 222 moving, which is shown in FIGS. 6B to 6A as the door 222-1 moving from the CLOSED position (FIG. 6B, at which the O-ring 228 touches the seal surface 226), to the OPEN position (FIG. 6A, wherein both of the doors 222-1 and 222-2 are in the OPEN position, separated by the spaces 234 from the walls 214).

The one common actuator 232 is shown in FIGS. 6A and 6B moved in the upper valve vacuum body 212, which is shown in FIGS. 6A and 6B mounted on top of a bottom plate 302. The body 212 has the slots 218P and 218T aligned with the X-axis, and is adapted to be sealed by the lid 236. A lower end 304 of a bellows 306 is sealingly attached to the bottom plate 302. An upper end 308 of the bellows 306 is sealingly attached to a bellows plate 310, shown in FIGS. 6A–6C extending outwardly from the common actuator 232. With the bellows 306 sealed to the bottom plate 302 and to the bellows plate 310, and with the lid 236 sealed to the top of the valve vacuum body 212, the body 212 is strong enough to resist the forces of a vacuum applied through the slot 218P, for example. The bellows 306 has a hollow cylindrical shape defining a cavity 312.

FIGS. 6A–6C show the one common actuator 232 supported on a mount 341 that is connected to the one common actuator 232, and that comprises a piston rod 338 of a first drive 336, and a rocker or cradle 322. The mount 341 with the piston rod 338 and the rocker 322 combine to support the one common actuator 232 for the above-described motion in the exemplary vertical orientation of the Z axis (shown in FIG. 6A) and for the motion into the exemplary tipped orientation of the Z axis (shown in FIG. 6B). In more detail, the bottom plate 302 carries four spaced arms 316 of a pivot frame 318, which FIGS. 6A–6C show is part of a tipping mechanism, which is a mechanism for tipping the mount 341 and the one common actuator 232, including tipping the Z axis into the tipped orientation shown in FIG. 6B. Two arms 316 extend downwardly to the left from the bottom plate 302 below the bellows 306. Another two of the arms 316 extend to the right from the bottom plate 302 below the bellows 306. Each opposite pair of arms 316 joins at a bridge 319 and a base 320. Each bridge 319 supports a pivot pin 321 that is centered on the C-axis. The pivot pin 321 provides a rotary mount for the rocker 322 of the mount 341. The rocker 322 has opposite arms 323, shown in FIG. 5 as being suspended from the respective pins 321 for rocking motion around the C-axis. The rocking motion of the tipping mechanism shown in FIG. 6B is provided by a second drive, shown in FIG. 6A as a double-acting first pneumatic motor 324 having an open/close cylinder 326, and a piston rod 328. The motor 324 is secured to the arms 316 by a bridge 329 (FIG. 5). One end of the piston rod 328 is secured to a pin 330 that is received in slots 331. FIGS. 6A–6C show the rocker 322 of the mount 341 as having the slots 331 so that when the piston rod 328 is retracted or extended the rocker 322 respectively rotates counterclockwise or clockwise on the C-axis. As shown in FIG. 6B, the rotation of the rocker 322 on the C-axis also rotates the piston rod 338 of the mount 341, and rotates the mount 341 which carries the one common actuator 232. The retracted piston rod position shown in FIG. 6B corresponds to, and causes, the tipping of the Z axis into the exemplary tipped orientation shown in FIG. 6B, and the corresponding tipping of the mount 341 and the one common actuator 232. This exemplary tipped orientation of FIG. 6B is shown as the one common actuator 232 causing the door 222-2 to be in the OPEN position since the piston rod 328 causes the rocker 322 to rock clockwise on the pin 321 (FIG. 6C). As shown in FIG. 6B, that retracted position also corresponds to movement of the one common actuator 232 to cause the door 222-1 to be in the CLOSED position. It may be understood that a fully extended piston rod position (not shown) corresponds to, and causes, the CLOSED position of the door 222-2 since the piston rod 328 causes the rocker 322 to rock the one common actuator 232 counterclockwise relative to the pin 321 opposite to the direction shown in FIG. 6B. A neutral position of the piston rod 328 is shown in FIGS. 6A and 6C and corresponds to the mount 341 positioning the one common actuator 232 to cause the simultaneous OPEN positions of both of the doors 222.

The rocker 322 also supports an up/down cylinder 334 of the first, or up/down, drive or motor 336. With the cylinder 334 fixed to the rocker 322 by opposite motor mounts 337, the piston rod 338 shown in FIGS. 6A–6C may be extended or retracted and slides through bearings provided in an opening 340 in the plate 302. The bellows 306 has the cavity 312 with a hollow cylindrical shape for receiving the mount 341 that comprises the piston rod 338 and the rocker 322 as described above. As shown in FIGS. 6A–6C, such bearings allow the piston rod 338 of the first drive 336 to be extended or retracted and correspondingly move the mount 341, the bellows plate 310, and the one common actuator 232 up or down.

FIGS. 6A–6C show the mount 341 connected to the one common actuator 232, which in turn supports the two doors 222-1 and 222-2 for rotation on hinge pins 342. Via the one common actuator 232 shown in FIGS. 3 and 6A–6C as being attached to the doors 222, as shown in FIG. 3 the mount 341 may support the doors 222 centered with respect to a mid-point of each door 222, such that each of the doors 222 is supported by the mount 341 centered about the longer side (or Y-axis dimension) of each respective door 222. FIGS. 3 and 6A show that as a result of this centered support of the doors 222, the closure force F in the direction of the X axis applied by the mount 341 through the one common actuator 232 to each door 222 is uniformly applied to each door 222, yet the one common actuator 232 enables the width W of the body 212 to be substantially reduced from that of valves in which two separate actuators are provided in a valve body. In practice, the width W of the body 212 need only be about six and one-half inches, for example.

It may be understood that when the piston rod 338 of the up/down first drive 336 is extended, the one common actuator 232 and the doors 222 are in the UP position (shown in FIGS. 6A and B) with the bellows 306 extended. When the piston rod 338 of the up/down first drive 336 is retracted, FIG. 6C shows that the one common actuator 232 and the doors 222 have been moved into the DOWN position with the bellows 306 retracted. With FIGS. 6A–6C showing the mount 341 attached to the common actuator 232, it may be understood then, that the mount 341 moves the common actuator 232, with the separate respective drive 324 and first drive 336 providing appropriate movement of the mount 341 as shown in FIGS. 6A–6C, so that the tipping movement of the common actuator 232 operates to simultaneously move the doors 222 in a first direction of the X-axis generally perpendicular to the respective first and second walls 214-1 and 214-2 of the body 212, and the up/down movement operates to simultaneously move the doors 222 in a second direction generally parallel to the walls 214 of the body 212. As shown in FIGS. 6A and 6C, the movement of the common actuator 232 to move the doors 222 in this second direction is movement of the common actuator 232 with its longitudinal axis (Z axis) perpendicular to the X axis. FIGS. 6A and 6C also show this movement of the common actuator 232 as being in response to the action of the second drive 336, and shows the one common door actuator positioning the doors 222 between the first and second slots 218T and 218P.

As described above, the piston rod 328 has a neutral position shown in FIG. 6A. As described below, this neutral position shown in FIG. 6A is referred to as a position with the one common actuator 232 centered between the sides 214 of the body, which is centering with respect to the vertical position of the Z axis. The neutral position corresponds to the OPEN position of the doors 222. When the piston rod 328 is in the neutral position the motor 324 is not actuated, such that there is no pneumatic fluid pressure on the piston rod 328 in either the left or the right direction. FIGS. 5 and 6A–6C show an actuator bias assembly, or centering mechanism, 350 provided for keeping the piston rod 328, and thus the rocker 322, the mount 341 and the common actuator 232, in the neutral position centered between the sides 214 of the body 212. In FIGS. 6A–6C, the rocker 322 is shown mounted for the swinging motion between the opposite stationary arms 316. FIG. 5 shows the base 320 having the centering mechanism 350, and FIGS. 6A and 6C show the vertical, or centered Z axis, that results from the centering mechanism 350 operating on the rocker 322 portion of the mount 341. The mechanism 350 includes opposite bias sections 352 mounted generally at the bottom of each arm 316. Each bias section 352 includes a bore 354 in the base 320 for receiving a bias plunger 356 for left and right movement with or against the force FB of a resilient member 358 such as a spring.

A threaded plug 360 is screwed into a threaded end 362 of the bore 354 to hold the bias plunger 356 in the bore 354. The bore 354 is provided with a shoulder 364 which limits the motion of the bias plunger 356 in the bore 354. Each of the two actuator bias assemblies 352 may exert the force FB in an opposite direction (parallel to the X axis) against the rocker 322, such that as shown in FIG. 6A the oppositely directed forces FB cause the rocker 322, the mount 341, and the common actuator 232 to be in the neutral position centered between the sides 214 of the body 212, in force equilibrium.

Each force FB is sufficient to overcome the frictional and other forces in the motor 324 when there is no pneumatic force on the piston rod 328. In this manner, the separate bias sections 352, in applying the respective leftward and rightward forces FB on the rocker 322, resiliently maintain the rocker 322 in the neutral position shown in FIGS. 6A and 6C. Each such force FB may be overcome when the motor 324 of the above-described tipping mechanism is appropriately actuated against such force FB. Thus the force of the motor 324 may overcome the respective bias section force FB and either cause left swinging (FIG. 6B) or right swinging of the lower portion of the rocker 322 around the pin 321. The mount 341 moves oppositely from the lower portion of the rocker 322 as shown in FIG. 6B, for example, which shows the Z-axis tipped so that the one common actuator 232 and the right door 222-1 are shown moved to the right to move the right door 222-1 into the CLOSED position corresponding to the lower portion of the rocker 322 moved to the left by the motor 324 of the tipping mechanism against the force FB from the left actuator bias section 352. Reference is made to the sequence of FIGS. 6A and 6B, which show that this action of the motor 324 of the tipping mechanism to cause the one door actuator 232 to move to the tipped orientation (FIG. 6B) occurs after the FIG. 6A positioning of the doors 222 centered between the first and second slots 218T and 218P. As shown in FIG. 6A, because the doors 222 are first centered between the slots 218T and 218P, and then (FIG. 6B) the motor 324 of the tipping mechanism causes the common actuator 232 to tip, the tipping drive is effective when the doors 222 reach the above-described position shown in FIG. 6A in which the doors are centered between the slots 218T and 218P. Further, as described below, the tipping of the common door actuator 232 moves either of the doors 222 to the CLOSED position and the other door 222 to the OPEN position.

The unmet needs of the prior art cluster tool architecture 100 are filled by the above-described dual sided slot valve 204 in the vacuum body 212 between the adjacent modules 206 and 202, such as the transport module 202 and the process module 206. One of the separate doors 222 is provided on the common actuator 232 for each of the two valve housing ports 218, such that one housing port 218P adjacent to the process module 206 and one housing port 218T adjacent to the transport module 202, for example, may be selectively closed while the other port remains open. For example, the selective closure facilitates maintaining a vacuum in the transport module 202 while one adjacent process module 206 is opened to the atmosphere to allow servicing to be performed. As a result, substantial periods of downtime are avoided in that no pump-down cycle is needed to bring the transport module 202 to a desired vacuum after servicing the one process module 206, and no other operations need be performed on the transport module 202 due to the servicing of the process module 206. Also, operations in the transport module 202 can continue uninterrupted. Thus, the total productivity of the cluster tool architecture 200 is enhanced because by keeping the transport module 202 under vacuum, one allows production to continue using the transport module 202 while servicing of the one process module 206 is performed.

Also, with the door valve 222-2 to the transport module 202 closed so that the transport module may be at vacuum, the passage of debris (such as broken wafers, not shown) from the open process module 206 may be blocked by the open door valve 222-1 associated with the process module 206 so that such debris do not contaminate the transport module 202. In addition, debris-blocking tabs 380 may be mounted within the body 212 above the doors 222 to further prevent the passage of the debris from the open process module 206, for example. Thus, in general, only the valve door 222-1 next to the process module 206 need be replaced during servicing after it becomes corroded, and the transport module 202 may remain at vacuum during such replacement.

Further, the dual sided slot valve 204 is provided with these advantages while initially allowing easy access to one or both open door valve 222 for performing service on the open door valves 222. Such easy access is provided by the common actuator 232 operated by the drives 324 and 336. To close one door valve 222, the drive 324 is actuated and stops with the one door valve 222 in the CLOSED position and the other door valve 222 in the OPEN position, and both door valves 222 in the UP position. If both valves are to be serviced, the tipping mechanism drive 324 is not actuated and the OPEN, centered position of each door valve 222 is resiliently maintained by the centering mechanism 350 that holds the common actuator 232 centered in the open-actuator position. In this OPEN position the open door valve 222 or door valves 222 may be reached by a gloved hand of a worker for service. The second drive 336 may function to move the common actuator 232 and cause both of the door valves 222 to move laterally (i.e., downwardly) away from the OPEN position and away from the respective ports 218 to expose the sealing surface 226 around the ports 218. Such exposure permits cleaning of the sealing surfaces 226, for example.

Due to the vertical distance between the laterally-moved door valves 222 and an access opening 262 (which is normally closed by the lid 236), it is generally difficult for the protective glove of the worker to reach the door valves 222 for service after the vertically downward movement. In the laterally downward moved position, however, there is a clear line of sight between the ports 218T and 218P such that the door valves 222 do not interfere with the worker's ability to clean around the door valves 222, including the surfaces 226 against which the door valves 222 seal.

Additionally, only one common actuator 232 is provided for both of the slot valve doors 222 so as to reduce the width W and thus reduce clean room real estate occupied by the valve housing 212 between the adjacent transport module 202 and process module 206a, for example. Also, such common actuator 232 applies the force F to each of the slot valve doors 222 at the central location of the slot valve door 222, which reduces the value of the force F required to maintain the slot valve door 222 closed. Further, with only one common actuator 232, only one bellows 306 is required, as compared to other valve assemblies that have two actuators and that thus require two bellows.

It may be understood, then, that while normal operations continue in one module (e.g., 202) of two adjacent modules 202 and 206a, many types of servicing may be performed in the other of the two modules (e.g., one adjacent process module 206). Such normal operations may, for example, allow use of the transport module 202 with another process module 206 that is also adjacent to the transport module 202, enhancing the total, or overall, productivity of the cluster tool architecture 200. Such servicing may, for example, include removing broken pieces of wafers from the one process module 206a or the valve housing 212, cleaning the sealing surface 226 of a port 218, cleaning the interior of the one process module, and removing and replacing a member of a valve 204 (e.g., a door 222 or an O-ring 228).

Although the embodiments of the foregoing invention have been described in some detail for purposes of clarity of understanding, it will be apparent that certain changes and modifications may be practiced within the scope of the appended claims. Accordingly, the present embodiments are to be considered as illustrative and not restrictive, and the embodiments of the invention are not to be limited to the details given herein, but may be modified within the scope and equivalents of the appended claims.

What is claimed is:

1. A dual slot valve for use in a semiconductor process cluster tool architecture arrangement, the dual slot valve comprising:

a housing having a first side and a second side, the housing having a first slot at the first side and a second slot at the second side for passing a substrate between a first module and a second module, the first module being attached to the first side of the housing and the second module being attached to the second side of the housing;

a first door being movably mounted within the housing to enable closure of the first slot;

a second door being movably mounted within the housing to enable closure of the second slot;

one door actuator, the one door actuator being connected to each of the first and second doors;

a mount configured to move the one door actuator with the first and second doors centered with respect to an axis, the mount being further configured to move the centered doors into a position between the first and second slots, the mount being further configured to cause the one door actuator to tip to a tipped orientation with respect to the axis so that in the tipped orientation either of the first and second doors closes a respective one of the first and second slots while the other of the first and second doors is positioned by the one door actuator with the respective other of the slots open; and a computer-controlled controller for operating the mount so that the one door actuator centers the doors.

2. A dual slot valve as recited in claim 1, wherein when the first and second doors are centered with respect to the axis, each of the first door and the second door is in an open position that is spaced from and between each of the first slot and the second slot, the valve further comprising:
- a centering mechanism for holding the mount so that the one door actuator is centered with respect to the axis and the first door and the second door are held in the open position; and
- wherein the controller is configured so that the mount causes the one door actuator to move the centered doors along the axis out of the position between the first and second slots.

3. A dual slot valve as recited in claim 1, the dual slot valve further comprising:
- a drive to cause the mount to move the one door actuator and position the first and second doors between the first and second slots.

4. A dual slot valve as recited in claim 3, the dual slot valve further comprising:
- a centering mechanism for causing the mount to position the one door actuator with the first and second doors centered between the first and second slots as the one door actuator positions the first and second doors between the first and second slots.

5. A dual slot valve as recited in claim 1, the dual slot valve further comprising:
- a tipping mechanism configured to act on the mount for tipping the one door actuator after the first and second doors have been positioned centered and between the first and second slots, the tipping mechanism positioning the mount to cause the one door actuator to tip to the tipped orientation.

6. A dual slot valve as recited in claim 1, the controller operates the mount so that the one door actuator tips to the tipped orientation to close the respective one of the first and second slots.

7. A dual slot valve as recited in claim 6, wherein the other door positioned with the respective other of the slots open is away from the respective other of the slots to permit maintenance of the respective other of the slots while operations continue in the module corresponding to the respective closed slot.

8. A dual slot valve for use in a semiconductor process cluster tool architecture arrangement, the dual slot valve comprising:
- a housing having a first side and a second side, the housing having a first slot at the first side and a second slot at the second side for passing a substrate between a first module and a second module, the first module being attached to the first side of the housing and the second module being attached to the second side of the housing;
- a first door mounted within the housing for movement in a direction of a first axis to enable closure of the first slot;
- a second door mounted within the housing for movement in the direction of the first axis to enable closure of the second slot;
- a common door actuator consisting of a single member, the single member mounting each of the first and second doors for the movement in the direction of the first axis, the common door actuator having a longitudinal axis;
- a mount for moving the common door actuator with the longitudinal axis in an orientation perpendicular to the first axis so that the longitudinal axis and the doors are in a position centered between the first and second slots;
- a tipping drive effective when the doors reach the position centered between the first and second slots to move the mount and cause the common door actuator to tip so that the common door actuator moves either of the first and second doors to close a respective one of the slots while the other of the first and second doors opens the respective other one of the slots; and
- a computer workstation configured with computer program instructions for controlling movement of the mount to close the respective one of the slots while the other of the first and second doors opens the respective other one of the slots.

9. A dual-slot valve as recited in claim 8, the tipping drive further comprising a mechanism configured to act on the mount for tipping the common door actuator, the tipping changing the orientation of the longitudinal axis with respect to the first axis from perpendicular to an acute angle, wherein when the tipping is in a first direction along the first axis the common door actuator moves the first door to close the first slot while the second door opens the second slot, and wherein when the tipping is in a second direction along the first axis the common door actuator moves the second door to close the second slot while the first door opens the first slot.

10. A dual-slot valve as recited in claim 8, further comprising:
- a drive for causing the mount to move the common door actuator with the longitudinal axis in the orientation perpendicular to the first axis; and
- a controller connected to the workstation for operating the drive so that the mount moves the common door actuator with the longitudinal axis in the orientation perpendicular to the first axis and the tipping drive is effective to tip the common door actuator when the doors reach the position centered between the first and second slots.

11. A dual-slot valve as recited in claim 10, further comprising:
- an assembly for holding the mount to position the common door actuator with the first and second doors in the position centered between the first and second slots as the common door actuator is moved with the longitudinal axis in the orientation perpendicular to the first axis.

12. A dual-slot valve as recited in claim 8, wherein the mount is configured so that in response to the computer workstation the mount moves the common door actuator to space the doors from the first axis.

13. A dual slot valve for use in a semiconductor process cluster tool architecture arrangement provided with a process module and a transport module, the dual slot valve comprising:
- a vacuum body having a first process module side and a second transport module side, the vacuum body having a process module slot at the first side and a transport module slot at the second side for passing a substrate between the process module and the transport module, the first side of the body having a first wall surface and the second side of the body having a second wall surface;
- a common actuator having a door-mount end movable in the body toward and away from each of the process module slot and the transport module slot along a closure path, the door-mount end being movable away from the body along an access path that is generally perpendicular to the closure path to provide a line of clear sight between the process module slot and the transport module slot;

a first door mounted to the door-mount end of the common actuator for movement along the closure path to open and close the process module slot, the first door being mounted by the common actuator for movement along the access path between an up position and a down position, in the up position the first door being parallel to and away from the first wall surface of the body to permit accessing of the first wall surface;

a second door mounted to the door-mount end of the common actuator for movement along the closure path to open and close the transport module slot, the second door being mounted by the common actuator for movement along the access path between an up position and a down position, in the up position the second door being parallel to and away from the second wall surface of the body to permit accessing of the second wall surface; and a dual acting actuator mechanism having a first drive for moving the door-mount end of the common actuator in the body toward and away from each of the process module slot and the transport module slot along the closure path, the actuator mechanism having a second drive for moving the door-mount end of the common actuator away from the body along the access path.

14. A dual slot valve according to claim 13, further comprising:
the common actuator having a bias-drive end opposite to the door-mount end, the common actuator being mounted for rotation on an axis located between the bias-drive end and the door-mount end; and
a dual-acting resilient bias mechanism attached to the bias-drive end of the actuator for resiliently holding the door-mount end of the actuator between and away from each of the process module slot and the transport module slot along the closure path.

15. A dual slot valve according to claim 13, further comprising:
a controller for separately controlling the first drive and the second drive; and
a computer workstation connected to the controller for enabling the first door to be in other than the closed position for servicing the process module at the same time as the second door is in the closed position to allow the transport module to operate other than in a service mode.

16. A dual slot valve according claim 15, further comprising:
the vacuum body having a door-access port to facilitate servicing the doors; and
the computer workstation comprising computer program instructions to cause the controller to operate the dual acting actuator mechanism and move the first door and the second door along the access path to the respective up position, and to move the first door along the closure path into an open position, and to move the second door along the closure path to close the second slot, in the up position of both doors with the first door in the open position the first door being in a position to be replaced with another door supplied through the door-access port.

17. A dual slot valve according to claim 15, further comprising:
the common actuator having a bias-drive end opposite to the door-mount end, the common actuator being mounted for rotation on an axis located between the bias-drive end and the door-mount end;
a dual-acting resilient bias mechanism configured to act on the bias-drive end of the actuator for rotating the bias drive end of the common actuator on the axis to releasably hold the door-mount end of the common actuator in a position between and away from each of the process module slot and the transport module slot along the closure path;
the vacuum body having a door-access port to facilitate access to the vacuum body; and
the computer workstation comprising computer program instructions to cause the controller to operate the dual acting actuator mechanism and allow the bias mechanism to releasably hold the door-mount end in the between and away position and to move the first door and the second door along the access path to the down position to enable servicing of the first and second wall surfaces through the door-access port.

* * * * *